Sept. 10, 1957  H. J. MODREY  2,805,875
SELF-LOCKING MECHANICAL COUPLING ASSEMBLY
Filed Sept. 8, 1953

INVENTOR.
HENRY J. MODREY
BY *Frederick E. Hane*
ATTORNEY

United States Patent Office
2,805,875
Patented Sept. 10, 1957

2,805,875

SELF-LOCKING MECHANICAL COUPLING ASSEMBLY

Henry J. Modrey, Stamford, Conn., assignor to Interlock Corporation, New York, N. Y.

Application September 8, 1953, Serial No. 378,896

10 Claims. (Cl. 287—20.5)

The present invention relates to a self-locking mechanical coupling assembly for releasably coupling two elements, more particularly to a coupling assembly including mechanical coupling means of the kind in which an engaging coupling member of the coupling comprises a clamping rod having on one end a one-sidedly enlarged clamping head, a wedging slide slidably guided alongside the clamping rod and the head thereon, yieldable means biasing the slide towards the head and actuating means for withdrawing the slide relative to the head, and in which a receiving coupling member comprises a wall member having a receiving opening therethrough. The two coupling members and, hence, the elements to be coupled are locked together by first passing only the clamping head through the receiving opening and then, by the action of said yieldable means, moving the slide into the space made available in the receiving opening alongside the clamping rod upon the passage of the clamping head whereby the clamping head is retained in a position overhanging the rim of the receiving opening. The two coupling members are released by retracting the slide from the receiving opening by the actuating means thereby making space available for withdrawal of the clamping head. Couplings of the general type above referred to, which are fully described in my prior Patent No. 2,464,543, are capable of conveniently, rapidly and safely coupling two elements.

By selecting appropriate dimensions and material, the clamping rod with the clamping head and the wall member including the receiving opening can be designed for an axial pull load within an extremely wide range. However, due to manufacturing tolerances and other reasons, the coupling will generally not hold the two elements to be coupled so tightly together that a slight relative movement thereof is precluded. In other words, the coupling will not prevent a more or less appreciable wobbling of the elements. While such wobbling has no adverse effect upon the axial pull load for which the coupling is designed, it is necessary or at least desirable for certain fields of application that the two elements are so firmly coupled that in effect they constitute a rigid single unit.

The principal object of the present invention is to provide novel and improved means which on one hand make use of the very advantageous and highly desirable properties of couplings of the aforesaid kind, and which on the other hand attain a practically rigid, wobble-free coupling between the two elements.

Another object of the invention is to provide novel and improved means which in coaction with the coupling means exert upon the two elements to be coupled a pulling force effecting the desired rigid coupling between the two elements.

A further object of the invention is to provide novel and improved bracing means for exerting either upon the wedging slide or the clamping rod or upon both these components of the coupling a pressure so directed that said components hold the two elements to be coupled in a tight, practically rigid fit.

Still another object of the invention is to provide novel means for controlling the aforesaid tightening or bracing means both as to the tightening and the release operation and also controlling the release means of the coupling.

For some designs it is necessary or at least desirable to employ several couplings of the aforesaid kind to join the two elements to be coupled for instance, when it is desired to couple two tubular elements of substantial diameter in axial alignment and so tightly that the two tubular elements form a practically rigid tube.

Accordingly, a further object of the invention is to provide for each of the several couplings bracing means which in coaction with the respective coupling bias the two elements to be coupled into a rigid position relative to each other and which can be simultaneously controlled as to the tightening operation and the release operation by a common control means.

Still a further object of the invention, allied with the preceding one, is to provide an arrangement in which said common control means also actuate the release means of all the couplings. Such an arrangement affords the important advantage that by operation of a single control means all the couplings can either be tightened or loosened and the coupling members of all the couplings can be disengaged from each other.

Another object of the invention is to provide in conjunction with the aforesaid control means indicating means for indicating the operational position of the control means so that an operator can conveniently ascertain whether the two elements to be coupled are coupled tightly or loosely or released from each other.

A more specific object of the invention, allied with the preceding one, is to provide means by which said indicating means function also as a safety means thereby assuring the operator that the tightening or bracing means are actually held in the set position.

Still another object of the invention is to provide a design of the bracing or tightening means and of the control means therefor which permits a very inexpensive and simple manufacture of said means. The provision of these means and the coaction thereof with the coupling means afford the additional important advantage that the manufacturing costs of the coupling means proper can be considerably reduced. Normally rather close tolerances must be observed for the coacting components of the couplings. With the arrangement according to the invention, the bracing or tightening means in effect take up the play and clearances between the coupling components so that wider tolerances than normal are acceptable for these components. Less precision work obviously results in lower manufacturing costs.

Other and further objects, features and advantages will be pointed out hereinafter and set forth in the appended claims forming part of the application.

In the accompanying drawing several now-preferred embodiments of the invention are shown by way of illustration and not by way of limitation.

Figure 1:
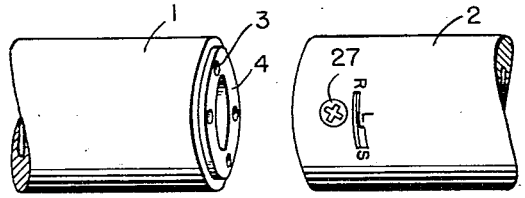
Fig. 1 is a fragmentary perspective view of two tubular elements to be tightly joined by couplings provided with bracing or tightening means according to the invention.
Figure 3:
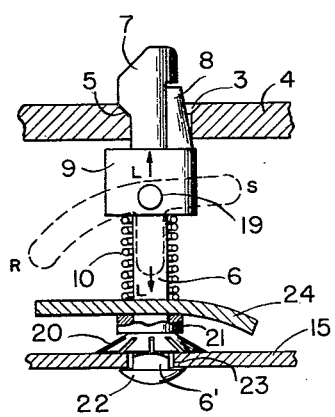
Fig. 3 is a vertical section of some of the components shown in Fig. 2 as such components would appear when looking at the coupling from that portion of the inside periphery of the tubular elements adjacent thereto, and toward their axes; but shows the two members of the coupling after they have been coupled.
Figure 2:
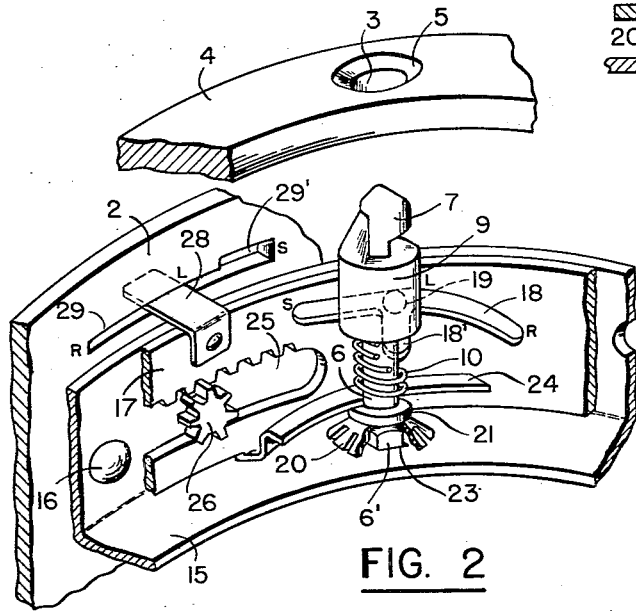
Fig. 2 is a fragmentary, enlarged-scale, perspective view, showing in detail one of the couplings and a portion of the bracing or tightening means for joining the two tubular elements of Fig. 1, engaging and receiving members of the coupling being shown as separated but in position to be coupled.

Referring first to Figs. 1, 2 and 3 in detail, Fig. 1 shows by way of example two tubular elements 1 and 2 to be firmly or rigidly joined in axial alignment. These elements may be visualized as constituting components of a structure or device the details of which are not essential for an understanding of the invention. The tube 1 supports receiving members of the couplings and the tube 2 supports engaging members of the couplings and also the tightening or bracing means according to the present invention. The tubes are shown as being equipped with four couplings but it should be understood that more or fewer couplings may be provided, depending upon the specific configuration and dimensions of the members to be joined.

Describing first the couplings proper, the receiving member of each of the couplings comprises a receiving or locking hole 3, all of the holes 3 being formed in a ring 4 fitted in the respective end of the tube 1. The receiving openings are preferably countersunk at 5 for reasons which will become apparent from the subsequent description. The ring 4 may be integral with the tube 1 or secured thereto and in outer diameter corresponds preferably to the inner diameter of the tube 2 so that the ring 4 may be telescoped into the tube 2 to effect a close joint between the butt ends of the tubes.

The engaging coupling member comprises a clamping rod 6 formed on one end with an enlarged one-sidedly overhanging clamping head 7, the configuration of which can best be seen in Fig. 3, which also shows that a slanted edge of the clamping head is seated upon the countersunk portion 5 of the respective receiving opening 3. The engaging coupling member further comprises a tapered wedging slide 8 which is fixedly secured to, or integral with, a ring or collar 9 slidably guided upon the clamping rod. A loaded compression spring 10 biases the collar 9, and with it the wedging slide, toward the position of Figs. 2 and 3 in which the wedging slide is nested in a corresponding recess of the clamping head. The spring 10 may be a weak spring, just strong enough for the purpose.

The clamping head 7 may just fit the receiving opening 3 or may be narrower, and the combined cross-sectional outline of the clamping rod 6 just below the clamping head and the tapered wedging slide 8 increases from an outline just fitting the opening to an outline slightly wider than the receiving opening. As can be clearly seen in Fig. 3, at the widest portion of the combined outline, the wedging slide extends slightly beyond the diameter of the receiving opening for reasons which will be more fully explained hereinafter.

Each of the couplings as hereinbefore described, operates as follows:

Let it be assumed that it is desired to join the two tubes by means of the couplings. For this purpose the two tubes are pressed against each other in axial alignment. As a result, each clamping head 7, more particularly the portion thereof protruding beyond the wedging slide 8, penetrates into the respective receiving opening. When each clamping head has penetrated sufficiently deep into its receiving opening, the respective wedging slide 8 engages the corresponding edge of the receiving opening (in Fig. 2 the edge opposite to the countersunk edge), whereby the slide is pushed back by this edge against the action of the spring 10 thus permitting the clamping head to penetrate deeper into the receiving opening. Upon complete passage of the clamping head through the receiving opening, space is made available for the wedging slide alongside the clamping rod portion just below the clamping head. The slide is now forced by the action of the compressed spring 10 into the receiving opening and into the position of Fig. 3. Consequently each clamping rod is held in a position in which its head overhangs the countersunk rim of the respective receiving opening whereby the clamping rods are latched to the ring 4 of the tube 1. It will be apparent that since those ends of the clamping rods opposite to the clamping heads are secured to the tube 2 the two tubes are locked together.

As previously mentioned, couplings as just described can be designed for practically any axial pull load but they generally do not prevent a slight wobble of one of the tubes relative to the longitudinal axis of the other tube, primarily by reason of the tolerances, usually in the order of a few thousandths of an inch, required for a smooth operation of the couplings and also due to manufacturing considerations.

The members of each of the couplings are released by retracting the wedging slide 8 from the receiving opening 3, thereby making space available for withdrawal of the clamping head 7 from its receiving opening.

The bracing or tightening means for eliminating a possible wobbling of the tube elements will now be described in detail.

As can be inferred from Fig. 2, the engaging member of each of the four couplings is supported on an L-shaped bracket 15 either integral with the inner wall of tube 2 or fixedly secured thereto by any suitable means such as rivets 16. This bracket supports a cam ring 17 which is fitted in the bracket 15, and is circumferentially rotatable relative thereto. The cam ring is formed with a slanted cam slot 18 generally extending in circumferential direction. The cam slot includes an axially elongated branch 18' extending approximately from the center part of the slot. The cam slot 18 including its axial branch 18' coacts with a pin 19 on the collar 9 of wedging slide 8. The slot branch 18' permits the wedge slide 8 and its collar 9 to be axially displaced relative to the clamping rod 6 during the latching operation previously described.

The clamping rod 6 is supported on the bracket 15 and hence on the tube 2 so as to permit a slight axial displacement of the rod relative to the lateral branch of the bracket. To this end, the rod is not firmly affixed to the bracket but is spring loaded by means of a preferably cupped spring washer 20 fitted between a cam ring 21 on the rod 6 and bracket 15. As can best be seen on Fig. 3, an end 6' of the rod is slidably extended through the bracket 15 and retained in the bracket by any suitable means such as a head 22. To prevent rotation of the clamping rod relative to the bracket, the end 6' of the rod and its mounting opening 23, in the bracket 15 are unround for instance square-shaped. The square cross section of the opening 23 also enables all four clamping rods to be assembled so that the overhanging sides of the clamping heads 7 point in the same direction to permit the required slight joint zig-zag movement of the rod and so that each clamping head 7 will remain in its assembled position.

The cam ring 21 coacts with a cam shelf 24 integral with or extending from the cam ring 17. This shelf has a portion parallel to the bracket 15 and a portion downwardly slanted relative thereto as can best be seen on Fig. 3.

For the purpose of rotating the cam ring 17 relative to the bracket 15 and the engaging coupling members supported on the bracket, any suitable means may be provided. There is shown a circumferentially extended rack slot 25 with which coacts a pinion 26 rotatable from outside the tube 2 by an operating screw or handwheel 27. It should be mentioned in this connection that a high gear ratio will permit the operating screw 27 to exert a very strong rotational torque upon the cam ring.

To indicate the operational position of the cam ring 17 within the tube 2, a position indicator is provided in the form of an arm or tongue 28 fixedly secured to the cam ring 17 and extending through a circumferentially extended slot 29 in the tube 2.

The slot 29 is slightly enlarged in axial direction to form an offset recess 29' and the indicator tongue 28 is springy and so biased that it will engage the offset recess 29' when placed in juxtaposition thereto. This coaction of the indicator 28 and recess 29' forms a safety means as will be more fully explained hereinafter.

The operation of the bracing or tightening means is as follows:

Let it be assumed that the coupling members of the four couplings are latched to each other, that is, the receiving hole 3, the clamping head 7 and the wedging slide 8 of each coupling occupy the positions of Fig. 3, and that the pin 19 of each coupling faces the axial slot portion 18'. As previously explained, the two tubes 1 and 2 are then safely connected for an axial pull load but they can still slightly wobble relative to each other, that is they are not connected into a single rigid or stiff unit. For the purpose of tightening or bracing the two tubes, the cam ring 17 is rotated by the screw 27 in a direction such that the pin 19 travels along the left hand section of the slot 18 (as seen in Fig. 2). This slot section is slightly upwardly slanted relative to the laterally extending branch of the bracket 15. As a result of the aforementioned rotation of the ring 17 two cam actions become effective.

1. The afore-mentioned portion of the slot 18 forces upwardly the pin 19 and with it the wedging slide 8. As this slide is slightly tapered, it wedges the clamping rod 6 firmly and unyieldingly against the wall of the receiving hole 3 in the locking ring 4 on tube 1. Consequently the two tubes are now rigidly held to form the desired single stiff unit.

2. The cam shelf 24 which, at least functionally, is part of the cam ring 17 rides with its downwardly slanted portion over the cam ring 21 thereby pulling the clamping rod 6 downwardly against the action of the spring washer 20. The result is that the two tubes 1 and 2 are braced relative to each other so as to form a single stiff unit.

It will be evident from the previous description that the two afore-described cam actions are cumulative in their bracing effect. In some cases only one of the two cam actions needs to be provided to produce the desired bracing of the tubes. If the first cam action only is used, the cam shelf 24 is omitted and the clamping rod is rigidly secured to the bracket 15. When the second cam action only is employed a nonwedging slide of uniform cross section may be used as then the wedging action of the slide 8 is not needed. However, it is desirable to retain the slot 18 and the pin 19 coacting therewith for reasons which will be subsequently explained.

In connection with the cam movements and the stiffening effects thereof, it may be mentioned that the respective movements are generally in the magnitude of a few thousandths of an inch. The provision of the tightening or bracing means permits wider tolerances of the latching mechanism of the couplings as the respective rod and slide movements during the tightening operation will take up the tolerances between the components of the latching mechanism.

The slot 18 and pin 19, in addition to effecting the bracing of the tubes, also serve to release the members of the couplings. As previously mentioned, the two members of each of the couplings are released by withdrawing the slide 8 relative to the clamping head and from the receiving opening 3. This is effected by rotating the cam ring 17 by means of the screw 27 so that the pin 19 rides along the downwardly slanted part of the slot 18. As a result, the collar 9 is forced downwardly thereby withdrawing the slide 8 from the receiving opening 3 so that the two tubes 1 and 2 can be separated, one from the other.

As appears from the previous description, the slot 18 provides three operational positions of the latching mechanism, to wit, the center position in which the pin 19 faces the axial slot branch 18', which position constitutes the latching or assembly position and may be marked L; the position at the left-hand end of the slot, which is the tightened or safety position and may be marked S; and the position at the right-hand end of the slot which is the release position and may be marked R. The circumferential length and position of the slot 29 for the indicator 28 are such that the indicator occupies positions in this slot corresponding to the positions of the pin 19 in the slot 18. Accordingly, the slot is also preferably marked with R, L and S on the outside of tube 2 so that the operator always knows the operational positions of the couplings from the position of the indicator 28. As will be noted, the springy indicator 28 will engage the recess 29' of slot 29 when placed in juxtaposition to this recess so that the bracing means are yieldably retained in the safety position.

It is further apparent from the previous description that a single cam ring and a single screw similar to the ring 17 and screw 27 may be used to simultaneously control any predetermined number of couplings and bracing means. However, several circumferentially spaced operating screws, rack slots 25 and pins 26 and also several position-indicators are preferably provided and so positioned that at least one operating screw and position-indicator are conveniently accessible and visible in each position of the two tubes. In case several operating screws are provided, it is of course possible to tighten the assembly by operating one screw and to release the same by operating another screw.

Figure 4:
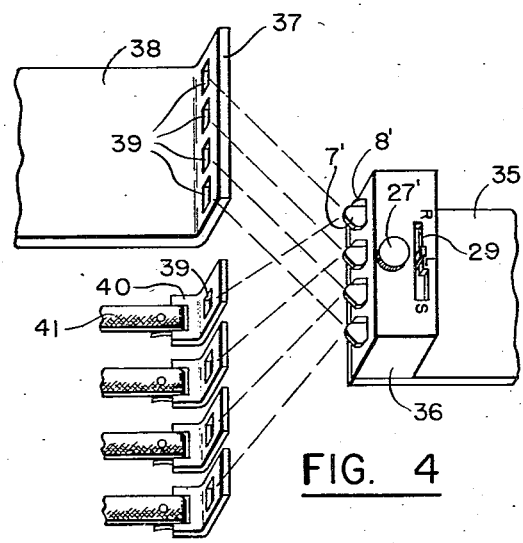
Fig. 4 is an isometric view of a modification of the elements to be coupled and of the coupling and tightening means therefor.

Fig. 4 shows a coupling and bracing arrangement according to the invention which corresponds in principle to the assembly according to Figs. 1 and 2. One of the elements to be coupled is shown as a flat arm or strip 35 which may be visualized as a part of a structure the details of which are not essential for the understanding of the invention. A box 36, affixed to the arm 35, is shown as housing the engaging members of four couplings and bracing means therefor of the kind described in detail in Figs. 1, 2 and 3. The clamping heads 7' and the slides 8' of the engaging members of the couplings are shown as being of the flat type.

Figure 5:
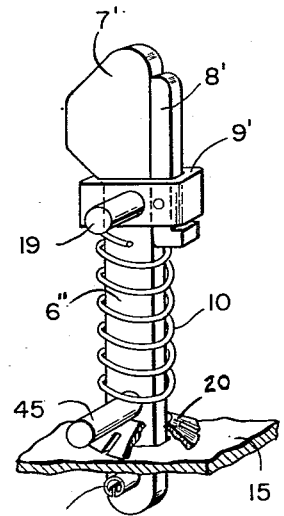
Fig. 5 is a perspective view showing a modification of the engaging member of the coupling shown in Figure 3, this modified engaging member being used to couple the modified elements shown in Figure 4.

Fig. 5 completely shows one of the four engaging coupling members that are only partly visible in Fig. 4. However, it should be understood that engaging coupling members of the type shown in Figs. 1, 2 and 3 could also be used with the assembly of Fig. 4, and that the flat clamping heads 7' and wedging slides 8' could be employed in the assembly according to Figs. 1, 2 and 3. The engaging coupling members on the arm 35 coact with correspondingly shaped receiving openings formed in the receiving coupling member. This receiving coupling member may consist of a flange 37 bent off at a right angle from a flat arm or strip 38 similar to arm 35. In this flange four rectangular receiving openings 39 are formed.

The receiving openings 39 may also be provided in wall portions of individual receiving coupling members. Four such receiving coupling members 40 are also shown in Fig. 4. Each of the coupling members 40 is secured to a webbing strap 41. As is apparent, each of the four coupling members 40 can be individually attached to the engaging coupling members and jointly released therefrom. The straps 41 may be visualized as a multipoint release for the harness of a parachute.

The operation of Fig. 4 will be apparent from the previous description. It suffices to state that by rotating the operating member which is shown as a handwheel 27' the mechanism can be placed in the selected one of the three positions L, S and R.

The structure of the engaging coupling member of Fig. 5 which as already mentioned may be used either with Figs. 1, 2 and 3 or Fig. 4, will be generally clear from the description of Fig. 3. It suffices to state that the latching slide 8' which is shown as having parallel side walls, is retained in position by a collar 9' slidably guided on the flat clamping rod 6". The cam ring 21 of Fig. 3 is replaced by a pin 45 which coacts with shelf 24 and spring washer 20 in the same manner as the ring 21. The rod 6″ is slidably extended through the bracket 15 and retained in this bracket by any suitable means such as a slotted roll pin 46.

While the invention has been described in detail with respect to certain now preferred examples and embodiments of the invention it will be understood by those skilled in the art after understanding the invention, that various changes and modifications may be made without departing from the function and scope of the invention, and it is intended, therefore, to cover all such changes and modifications in the appended claims.

What is claimed as new and desired to be secured by Letters Patent, is:

1. In a self-locking mechanical coupling assembly for rigidly coupling two elements, in combination, a receiving coupling member comprising a wall member formed with a receiving opening and rigidly attachable to one of said elements, an engaging coupling member comprising a clamping rod having on one end a one-sidedly enlarged clamping head fitting through said receiving opening, a wedging slide slidably guided alongside the clamping rod, a spring yieldably biasing the wedging slide into the receiving opening and toward the clamping head, the combined peripheral outline of said wedging slide and the clamping rod just below the clamping head increasing in the direction away from said clamping head from a peripheral outline just fitting the receiving opening to a peripheral outline just wider than said opening, a support means mounting the other end of said clamping rod and rigidly attachable to the second one of said elements, a bracing member movably supported on said support and in engagement with said wedging slide for axial displacement of the latter toward the clamping head for positively pressing the wedging slide against the clamping head, and actuating means coacting with said bracing member for selectively moving the latter either into said pressure position or into a loose position relative to the clamping head in which the position of the wedging slide relative to the clamping head is controlled by the biasing action of the spring whereby in that position of the coupling members in which said clamping head is extended through the receiving opening and the wedging slide occupies the receiving opening alongside the clamping rod the pressure exerted by the bracing member upon the wedging slide firmly wedges the latter, the clamping rod and the support mounted thereon to the receiving coupling member.

2. A coupling assembly according to claim 1, wherein said bracing member comprises a cam member displaceable in a direction generally transverse to the axis of the clamping rod and including a cam slot slanted relative to said transverse direction, and wherein a cam pin extending from said wedging slide rides in said slot for effecting a positive axial displacement of the slide in response to a transverse displacement of the cam member.

3. A coupling assembly according to claim 2, wherein the length and the slant of the cam slot in the cam member are such that in a predetermined intermediate position of the cam pin in the slot the slide is yieldably held by spring action only, in a predetermined upper pin position the slide is positively held in said wedging position, and in a predetermined lower pin position the slide is retracted relative to the clamping head and against said spring action, the latter slide position being the position for separation of the two coupling members.

4. A coupling assembly according to claim 3 and further comprising indicating means controlled by the position of said cam member, the position of the cam member being indicative of the three pin and slide positions.

5. In a self-locking mechanical coupling assembly for rigidly coupling two elements, in combination, a coupling means including a receiving coupling member comprising a wall member formed with a receiving opening and rigidly attachable to one of said elements, an engaging coupling member comprising a clamping rod having on one end a one-sidedly enlarged clamping head fitting through said receiving opening, a wedging slide slidably guided alongside the clamping rod, a spring yieldably biasing the wedging slide into the receiving opening and toward the clamping head, the combined cross-sectional outline of said wedging slide and the clamping rod just below the clamping head substantially fitting said receiving opening, a support rigidly attachable to the second one of said elements and mounting the other end of the clamping rod so as to allow for a limited axial displacement of the clamping rod relative to the support, a bracing member for the clamping rod movably mounted on said support, said bracing member being selectively movable into a position displacing the clamping rod toward the support and into a position releasing the clamping rod, and actuating means for said bracing member for selectively placing the latter into either one of its said two positions, whereby in that position of the coupling members in which the clamping head is extended through the receiving opening and the wedging slide occupies the receiving opening alongside the clamping rod, the displacement of the clamping rod effected by the bracing member firmly presses the rod toward the support thus causing the clamping head portion overhanging the receiving member to pull the wall member of the receiving coupling member toward the support.

6. A coupling assembly according to claim 5, wherein said movable bracing member includes a cam surface engageable with said clamping rod for axially pressing the latter toward the support means upon movement of the bracing member in one direction and releasing the clamping rod upon movement of the bracing member in the opposite direction.

7. A coupling assembly according to claim 5 and further comprising indicating means movable in unison with the bracing member and indicating the position thereof, said position being indicative of the position of the clamping rod relative to the support means.

8. A coupling assembly according to claim 5, wherein said bracing member is movable transversely to the axis of the clamping rod and further includes a second camming surface, and wherein a cam pin extending from the wedging slide engages said second camming surface, said second camming surface guiding said pin into a position withdrawing the wedging slide relative to the clamping rod upon movement of the bracing member to said position releasing the clamping rod.

9. In a self-locking mechanical coupling assembly for rigidly coupling two elements, in combination, a coupling including a receiving coupling member comprising a wall member formed with a receiving opening and rigidly attachable to one of said elements, an engaging coupling member comprising a clamping rod having on one end a one-sidedly enlarged clamping head fitting through said receiving opening, a wedging slide guided alongside the clamping rod, a spring yieldably biasing the wedging slide into said receiving opening and toward the clamping head, the combined peripheral outline of said wedging slide and the clamping rod just below the clamping head increasing in the direction away from said clamping head from a peripheral outline just fitting the receiving opening to a peripheral outline just wider than said opening; a support mounting the other end of the clamping rod so as to allow for a limited axial movement of the clamping rod relative to the support and rigidly attachable to the second one of said elements; bracing means for the wedging slide and the clamping rod, said bracing means being mounted on the support and being movable into a position, positively displacing the wedging slide toward the clamping head and the clamping rod toward the support respectively; and actuating means for moving the bracing means into said position effecting displacement of both the slide and the rod whereby in the locking position of the coupling members in which the clamping head is extended through the receiving opening overhanging the same and the wedging slide occupies the receiving opening alongside the clamping rod, the pressure exerted by the bracing means upon the wedging slide firmly wedges the latter, the clamping rod and the support to the receiving coupling member and the pressure exerted by the bracing means upon the clamping rod pulls the receiving coupling member toward the engaging coupling member.

10. In a coupling assembly according to claim 9, a plurality of said coupling means, a plurality of said bracing means each coacting with the wedging slide and the clamping rod of the respective one of said coupling means, common support means supporting all said clamping rods for limited axial movement thereof and movably supporting all said bracing means, and a common actuating means for jointly operating all said bracing means.

References Cited in the file of this patent

UNITED STATES PATENTS

| | | |
|---|---|---|
| 862,236 | Corry | Aug. 6, 1907 |
| 1,104,765 | Baloun | July 28, 1914 |
| 1,194,309 | Miller | Aug. 8, 1916 |
| 1,273,873 | Kollock | July 30, 1918 |
| 1,601,024 | Jacobson | Sept. 28, 1926 |
| 2,427,297 | Modrey (I) | Sept. 9, 1947 |